Nov. 26, 1963  G. T. HAMMOND  3,112,136
ARTICLE GROUPING AND STACKING APPARATUS
Filed March 23, 1959  5 Sheets-Sheet 1

INVENTOR.
GERALD T. HAMMOND
BY Philip H. Sheridan
ATTORNEY

Nov. 26, 1963    G. T. HAMMOND    3,112,136
ARTICLE GROUPING AND STACKING APPARATUS
Filed March 23, 1959    5 Sheets-Sheet 4

INVENTOR.
GERALD T. HAMMOND
BY
*Philip H. Sheridan*
ATTORNEY

United States Patent Office 3,112,136
Patented Nov. 26, 1963

3,112,136
ARTICLE GROUPING AND STACKING
APPARATUS
Gerald T. Hammond, Hugo, Colo.
Filed Mar. 23, 1959, Ser. No. 801,281
8 Claims. (Cl. 294—107)

This invention is related to the grouping of a series of articles for transfer and release in predetermined, stacked relation. More particularly, this invention has relation to a hydraulically actuated apparatus adaptable for the simultaneous grouping and stacking of a series of hay bales and the like.

For purposes of illustration, the present invention will be described with reference to the baling and stacking of agricultural products, such as, hay bales. In the hay bailing operation, for example, it is customary to first collect the hay and wrap it into individual bales, manually stack the bales onto a sled or similar device, then transfer the bales from the sled to a main stack. In this operation, it is also customary to employ in conjunction with a hoisting mechanism, a bale engaging unit which may be actuated to engage the individual bales stacked on the sled, lift each bale onto the stack where it is manually guided into the desired position and then released.

In accordance with the present invention, it is proposed to accelerate the entire hay stacking operation and to mechanize the steps of transferring the hay from the sled to the main stack whereby a number of individual bales on the sled are simultaneously engaged by a series of bale engaging units, are mechanically aligned and grouped together in tight, side by side relation and are then transferred to the main bale stack where they are then released in group relation.

When engaging a series of individual bales on the sled, it should be kept in mind that the bales are commonly mis-aligned and in slightly spaced relation and accordingly it is first necessary to engage simultaneously the individual bales of hay, align them and move them into tight, side by side relation. Also, out in the field, the sled is very often disposed, such as on a hillside, so that it is necessary to be able to vary the angle and direction of approach of the series of bale engaging units with respect to the bales selected for transfer to the stack, and accordingly the bale engaging units must be made adjustable for tilting and pivotal movement in order to properly align the bale engaging units with the bales to be stacked. Moreover, in order to provide for smooth working movement of the bale engaging units it is advantageous to so support the units as to prevent any possibility of binding in movement and to make available an ample source of power which can be selectively controlled to actuate the apparatus as a whole for movement into the desired position.

More specifically, it is important to enable self adjustment between the respective bale engaging units such that, upon engaging a series of hay bales, the units will move only through the necessary distance to properly align the bales notwithstanding their relative disposition when first engaged and in providing for self adjustment of the units, not to impose too great a resistance on the power source and delivery lines.

It is therefore a consequent and primary object of the present invention to provide for an apparatus to carry out the mechanized article engaging, aligning and grouping together of a series of articles for transfer and lifting to an elevated position on a stack.

It is another object to provide for a remote controlled grouping and stacking apparatus for simultaneous engagement with a series of articles, and especially those articles characterized by their bulkiness and weight, to properly align and group the articles together for release in a predetermined position on a stack, and furthermore, wherein the apparatus is capable of engaging the articles notwithstanding their relative height and disposition.

It is a further object to provide in an apparatus of the character described article engaging units for engagement with a series of loosely grouped articles, such as hay bales, and wherein the article engaging units are self adjustable for grouping of the articles into aligned, contacting relation, notwithstanding their initial relative disposition, for subsequent release onto a stack.

It is a further object to provide for a hay bale grouping and stacking apparatus which may be selectively and remotely controlled for the rapid delivery of power in accordance with the power requirements of the respective units forming the grouping and stacking apparatus to carry out the simultaneous engagement, then alignment and finally, release of a series of hay bales into desired position onto a main stack.

Figure 1:
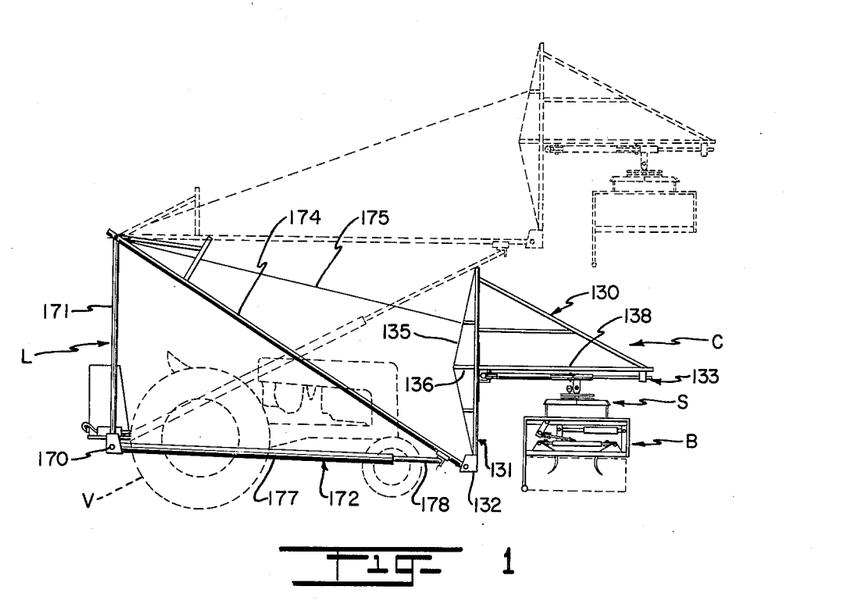
FIGURE 1 is a side elevational view of a preferred form of grouping and stacking apparatus, in accordance with the present invention.

As a setting for the following detailed description of the construction and operation of the individual components forming the apparatus of the present invention, there follows a general description of the interrelationship between the components, together with the manner in which the parts function together to carry out the intended results. Assuming that the bales of hay have been loosely grouped together on the sled in groups or series of four bales in a row, as shown in FIGURE 1, bale basket B is provided with a corresponding series of four fork units F which are synchronized to simultaneously engage each row of bales. In turn, the bale basket B is hung, through suspension unit S, from an overhead bale carriage C, this bale carriage C forming an extension of a conventional loader or main hoisting mechanism L which is attached in a well-known manner to a vehicle V. The suspension unit S is most desirably designed to, first of all, make the bale basket self-leveling so that, regardless of the slope of the terrain, the fork units F on the bale basket will always be maintained in a level position; also, the suspension unit is constructed to provide selective turning or pivotal movement of the bale basket about a vertical axis and in this way, not withstanding the angle of approach of the vehicle to the bales and the angle of the bales on the stack to the bales on the sled, the bale basket may be brought into alignment with the bales and after picking up the bales, may again be turned to the desired angle for depositing the bales onto the stack. The latter is important in that it is desirable to stack every tier of bales at ninety degrees to the adjacent tiers. Once the vehicle is brought into proximity with the sled and stack, it is further desirable to make the bale basket longitudinally and transversely adjustable so that with minimum movement of the vehicle the bale basket and associated fork units may be brought into desired alignment with the row of bales to be stacked. To this end, the bale basket and suspension unit are connected into the bale carriage in such a way as to permit selective movement of the suspension unit and connected bale basket through limited distances both longitudinally and transversely with respect to the stationary bale carriage frame.

When the bale basket is properly aligned over the row of bales to be grouped and stacked, the fork units are actuated to drive the forks into engagement with each of the bales. As mentioned, the bales are commonly loosely grouped together, and accordingly, means are provided on the bale basket to move the fork units and connected bales parallel to one another the necessary distance to align the ends of the bales and also converge them into contacting relation. At this point, the main hoist mechanism L may be brought into play to maneuver the bales for transfer over to the stack, and also the basket may be actuated sideways, forward or backward the desired distance, and pivoted to the desired angle for release of the bales in desired position on the stack.

To actuate the individual parts, a hydraulic control circuit H is suitably employed, including a power source and a central control valve system having five control circuit lines with one loading into the bale basket to synchronously operate each of the fork units for engagement and release of the bales. A second line causes slidable parallel and transverse movement of the fork units for alignment and movement of the bales into tight side by side relation. A third control line leads into the suspension unit to impart selective turning movement to the bale basket to the desired angle, and the remaining control lines are fed into the bale carriage for selective longitudinal and sideways movement of the suspension unit and connected bale basket with respect to the carriage. Also leading from the main power source is a valve which in a conventional manner is employed to actuate the main hoisting mechanism L to cause the desired lifting and lowering of the bale carriage C, suspension unit S and bale basket B.

*Bale Basket*

Referring more specifically to FIGURES 2 through 5, inclusive, there is shown a bale basket B broadly comprised of a rectangular frame 10 with a series of four juxtaposed fork units, F1, F2, F3 and F4 mounted for slidable parallel and transverse movement along the frame 10, a prime mover 12 operative to impart the desired parallel and transverse movement to the individual fork units F, together with a lining bar 13 to aid in alignment of the bales and a bracket assembly 14 for suspension of the basket from the unit S.

Figure 2:
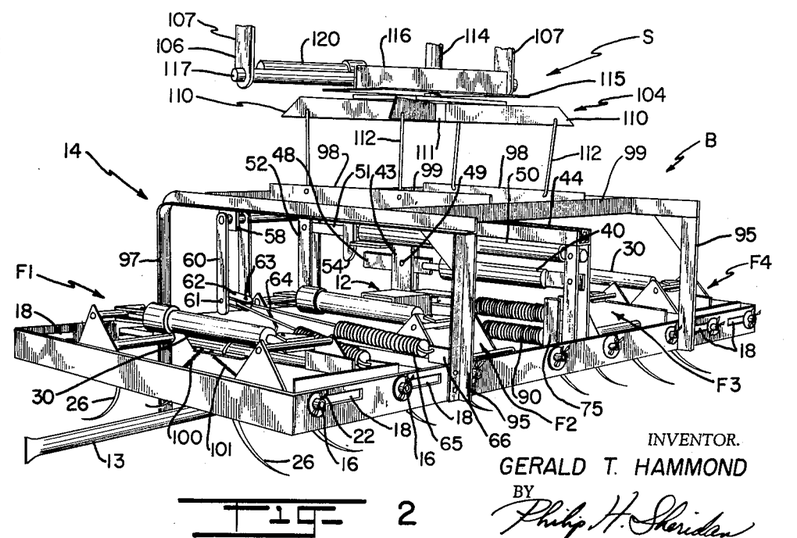
FIGURE 2 is a perspective view, in detail, of the bale basket and suspension unit of the present invention.
Figure 3:
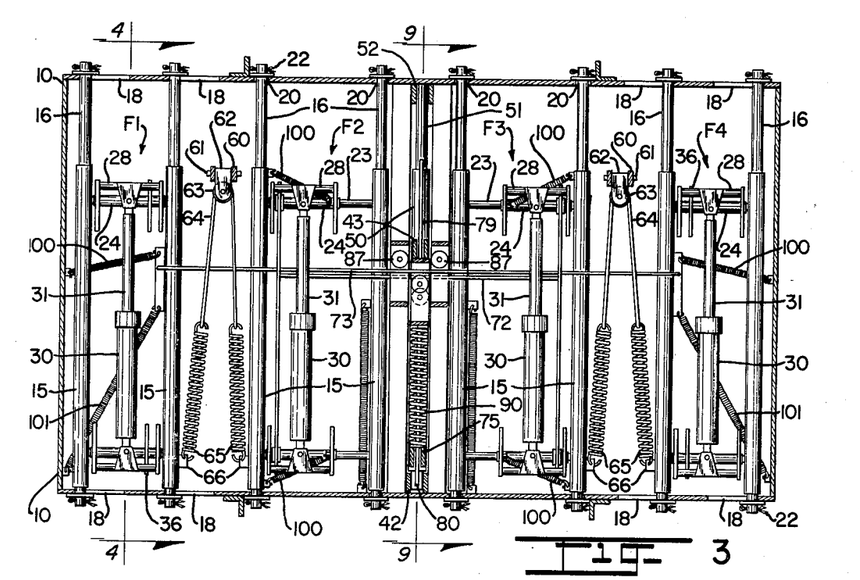
FIGURE 3 is a plan view of the bale basket shown in FIGURE 2.
Figure 4:
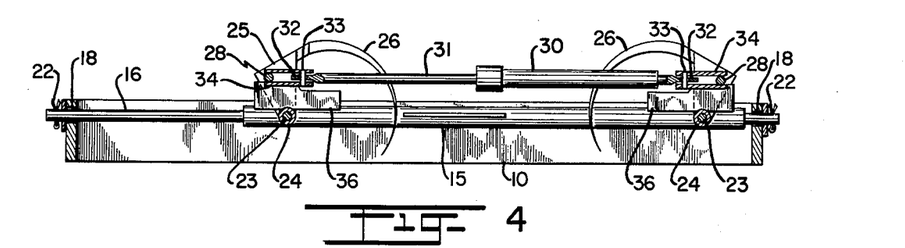
FIGURE 4 is a section view of a fork unit forming a part of the bale basket, taken on line 4—4 of FIGURE 3.
Figure 5:
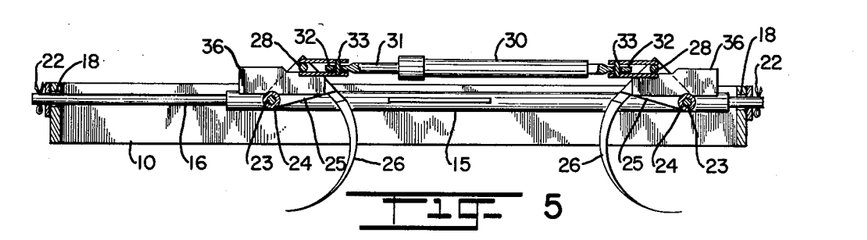
FIGURE 5 is a section view similar to FIGURE 4 illustrating the disposition of the fork unit in article engaging position.

To provide for slidable parallel movement of the fork units F on the frame, each of the fork units includes frames consisting of elongate tubular bearing members 15 disposed for slidable movement on inner concentric pipes 16, there being a pair of tubular members 15 and pipes 16 for each fork unit with the ends of the pipes projecting in spaced relation through opposite sides of the frame 10. As noted from the drawing, the outer fork units F1 and F4 are mounted such that the rod members 16 project through elongate slots 18 so as to permit slidable transverse movement of the outer units. However, the inner fork units F2 and F3 have the members 16 stationarily disposed through openings 20 in the sides of the frame, and fasteners such as cotter pins 22 are employed throughout to hold the ends of members 16 in position on the frame.

Connected across the ends of the tubular members 15 are shafts 23 having sleeves 24 journaled thereon to form pivotal connections for radial arm portions 25, the arms 25 in turn having connected thereto half circle hooks or tines 26. In each fork unit F there is therefore provided a set of hooks 26 mounted at opposed ends of the bearing 15 in facing relation for pivotal downward swinging movement toward one another about the shafts 23. Interconnecting each pair of arm members 25 at their outer ends is a cross support 28 journaled to the arms and extending between the cross supports of each unit F is a hydraulically actuated cylinder 30. Each cylinder 30 is connected at its closed end to one cross support and has a piston rod 31 extending from the opposite end for connection to the opposed cross support 28. The connecting ends of the cylinder 30 and the piston rod 31 are provided with eyes 32 through which are extended pivot pins 33, each of the pins 33 being connected to spaced plate members 34 attached to the cross support 28. In this way, the cylinders and connected rods are made laterally pivotal so as to prevent binding therebetween in the event of shifting of one end of each unit in relation to the opposite end. Extending from one side of the frame across and above each of the sleeves at that side are limit bars 36, each being positioned to limit the swinging movement of the hooks 26 by engagement with cross support 28 at the end of the fork units.

It will be seen from FIGURE 3 that the sleeves 24 of fork units F1 and F4 are of a width substantially equal to the shafts 23; however, the shafts 23 on the inner fork units F2 and F3 are of a substantially greater width than the outer sleeve members 24. Accordingly, the sleeves 24 are not only pivotal about the shafts 23, but are also slidable along the length of the shafts to establish and permit inward and outward transverse movement of the inner fork units; whereas, transverse movement of the outer fork units F1 and F4 is made possible by mounting the rod 16 in slots 18 on the sides of the frame. Of course, the inner fork units may also be made slidable in slots similar to the arrangement employed for the outer fork units so as to obviate the possibility of binding of the units in sliding across the frame.

To cause parallel movement of the fork units, there is provided a prime mover mounted on the frame 10 to extend thereacross between the inner fork units F2 and F3. The prime mover 12 consists essentially of a main cylinder 40 and piston rod 41 extending from one end of the cylinder 40, the piston rod and cylinder being pivotally connected at their free ends to standards 42 and 43, respectively. The cylinder 40 is held in stationary position by the standard 42, since the standard is connected at its lower end to the inside of the frame 10 and at the upper end to U-shaped bracket 44 connected to the bracket assembly 14. The standard 42 consists of a pair of elongate bars and the end of the cylinder is connected into the plates by means of a pin 45 extending through an opening in extension 46 forming the connecting end of the cylinder. In turn, the piston rod 41 is provided with an extension in the form of a plate 48 which is connected to spaced vertical plates forming the standard 43 by means of pin 49. However, the standard 43 is made slidable by connecting the upper and lower ends of the standard to tubular bearing members 50 which are journaled for sliding movement on shafts or rods 51, the latter members 51 being connected at their rearward ends to the standard 42 and at the opposite ends to front plates 52 also extending between the frame 10 and overhead bracket member 44. When the cylinder 40 is energized the piston rod 41 will be caused to move through the cylinder so as to cause the upper and lower bearing members 50 to slide along the length of the rods 51. In order to translate the movement of the piston rod into the respective fork units, a cam member 54 extends downwardly into the path of travel of the upper tubular member 50 so as to follow the movement of the top member 50 as it is forced along the shaft 51 by the piston rod 41. The cam member 54 forms an extension of a shaft 55, the shaft 55 being mounted in a sleeve 56 on the top surface of the bracket 44 which together extend horizontally in spaced relation above the fork units and terminate between the inner and outer fork units on either side of the main cylinder. The shaft 55 extends slightly beyond the sleeve 56 and is journaled at its terminal ends in hangar plates 58 suspended from the bracket assembly 14. Disposed in spaced relation on each of the shaft ends are a pair of rocker arms 60 extending downwardly and terminating at a point between the cross supports 28 at the ends of the fork units. Interconnecting the lower end of each pair of rocker arms 60 is a rod 61 to which there are journaled roller assemblies 62 each including a roller 63 over which there is trained a cable 64. The ends of the cable 64 are connected to adjacent sides of each pair of fork units F1, F2 and F3, F4 through coil springs 65 and connecting plate 66. Accordingly, as the cam member 54 is caused to pivot upwardly in response to the movement of the piston rod 41, the shaft 55 will transmit this movement into the rocker arms 60 which in turn will cause the fork units on either side of the main cylinder to follow the movement of the rocker arm 60. Since the bales are not always aligned in the same manner, it will be necesssary to make the respective fork units capable of moving only the necessary distance to bring the respective bales into engagement with the lining bar 13, and accordingly springs 65 are of a strength to normally permit unrestricted movement of the fork units, but upon engagement of a bale with the lining bar, the respective fork unit will remain stationary and the spring 65 for that respective fork unit will stretch to absorb the continued movement of the piston rod 41.

It will be apparent that a cross cylinder may be similarly employed to cause transverse, inward movement of the fork units into close, side by side relation; however, it is greatly preferred to employ the single prime mover 12 to perform the work of both moving the fork units in parallel and to telescope the units together for the alignment of the bales. In accordance with the present invention, this is accomplished by the disposition of a lower pulley unit 70 and upper pulley unit 71 beneath the main cylinder 40 and piston rod 41 with the pulley units 70 and 71 being so mounted as to normally follow the movement of the piston rod 41 and at a predetermined interval in the path of travel of the piston rod, to establish engagement of the rod 41 with linking members 72 and 73 respectively, suitably formed of a flexible cable or chain, the upper cable 73 being connected to the outer fork units F1 and F4 and the lower cable 72 being connected to the inner fork units F2 and F3. In order to support the pulley units 70 and 71, there are provided upright plates 75 extending in spaced relation from the lower tubular member 50, and the plate 75 together with the upright plates forming the standard 43 include spacer bars 76 disposed at spaced levels along the plates 43 and 75. The spacer bars 76 at each level are aligned with one another so as to form lower openings 77 and upper openings 78, with the lower and upper pulley units having extensions 79 and 80 extending horizontally from the forward and rearward ends of the units through the openings 77 and 78 formed by the spacers 76. The pulley units proper are each made up of a relatively enlarged housing portion 81 of a width to engage the plates 43. Mounted within the lower housing is a pulley 82 at the rearward section thereof by means of a vertical shaft 83 extending through the walls of the housing. In turn, the upper pulley unit 71 includes pulley 84 rotatable on shaft 85 in the forward section of the housing.

Figure 9:
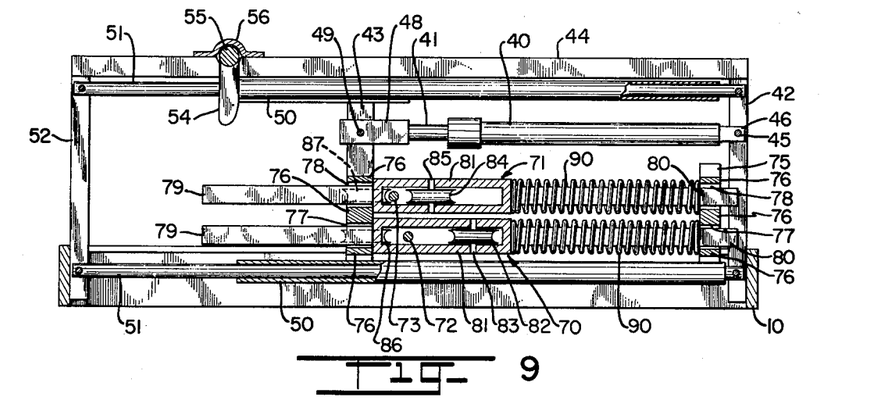
FIGURE 9 is a section view taken on line 9—9 of FIGURE 3.

As shown in FIGURES 3 and 9, on each side of the central pulley units 70 and 71 there are provided lower stationary pulleys 86 over which the cable member 72 for the lower pulley unit 70 is trained, and pulleys 87 over which the upper cable member 73 for the pulley unit 71 is trained, so that the respective cables are trained to extend across the rearward surfaces of the stationary pulleys 86 and 87, and across the front surfaces of the movable pulleys 82 and 84. Rearward extensions 80 also have interposed between the plates 75 and the ends of the respective housings 81 for the pulley units spring members 90, and it is the purpose of the spring members to be of a strength to normally impart the movement of the rod 41 to the pulley units 70 and 71 whereby they are caused to move horizontally in response to the movement of the piston rod 41. In response to this movement, the upper pulley 84 will first engage the cable 73 and upon continued movement of the pulley the ends of the cable, which are connected to the outer fork units F1 and F4, will be pulled inwardly to thereby cause the pipes 16 of the outer fork units to move laterally along the slots 18. Due to the greater spacing between the lower pulley 82 and cable 72, at a later point in the travel of the piston rod 41, the lower pulley 82 will subsequently engage the cable 72 and in a similar manner cause movement of the inner fork units F2 and F3 along the shafts 23 inwardly toward the center of the bale basket. By interposing the springs 90 between the pulley units and upright plate 75, once the bales have become grouped into tight, side by side relation and can move no closer together, any continued movement of the piston rod will be absorbed by the springs 90 which will be compressed inwardly toward the end of the housing 81.

The bracket assembly 14 forms an upward extension of the frame 10 for connection into the suspension unit and is made up of upright braces 95 extending from the sides of the frame 10 together with braces 97 extending horizontally then vertically into connection with the opposite sides of the frame. The lining bar 13 is suitably connected into the frame by continuing the braces 97 downwardly beyond the frame and attaching the lining bar 13 in horizontal disposition to the ends of the extensions 97. Also, braces 98 are extended between cross bars 99 which form the connecting means into the suspension unit S.

When the bales are properly moved into close side by side relation, by reversing the direction of movement of piston rods 31 of each of the fork units, the piston rods will be forced out of the cylinders 30 so as to cause movement of the hooks 26 away from engagement with the bales, whereupon the bales will be released in tightly grouped disposition onto the stack. Similarly, by reversing the direction of movement of the rod 41 the pulley units will return to the original position along with the rocker arms 60, and the fork units F1 to F4 are caused to return to their initial spaced apart positions by means of lateral return springs 100 and parallel return springs 101 for each of the units. Since the outer fork units F1 and F4 are caused to move transversely or laterally in relation to the frame, their lateral return springs are interconnected between one of the tubular members 15 and the ends of the frame, whereas the lateral return springs 100 for the inner fork units F2 and F3 are interconnected between the shafts 23 and tubular members 15, since the relative movement takes place between these two members. The parallel return springs are, however, similarly interconnected between the one of the tubular members 15 on each of the fork units and the sides of the frame 10. Accordingly, when pressure is reversed in the main cylinder 40 the return springs will cooperate with the piston rod 41 to cause movement of the fork units into their spaced apart positions and movement of the piston rod into its normal, inwardly disposed position within the cylinder 40.

*Bale Basket Suspension Unit*

Figure 6:
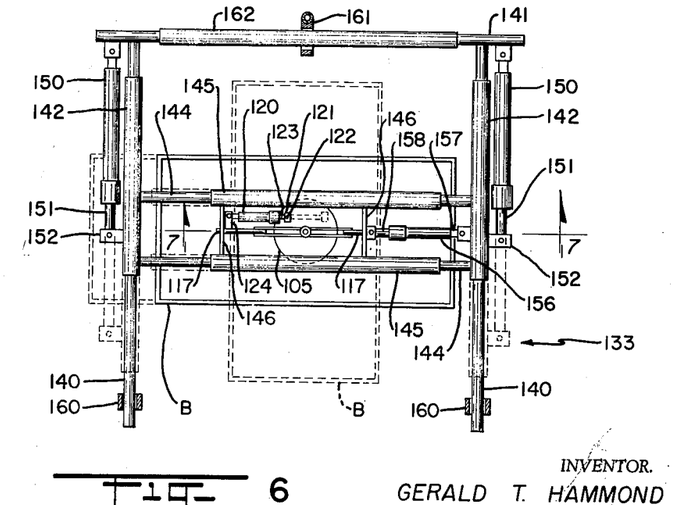
FIGURE 6 is a plan view of the suspension unit, in accordance with the present invention.
Figure 7:
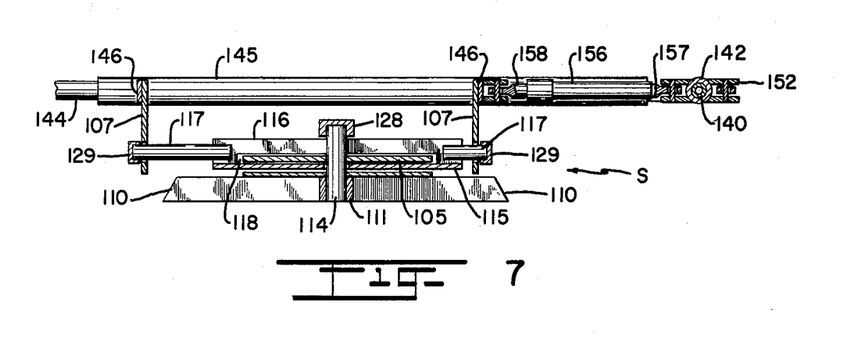
FIGURE 7 is a section view, taken on line 7—7 of FIGURE 6.

The suspension unit S is interposed between the bale basket B and bale carriage C in such a way that the bale basket may be controlled for turning about a vertical axis for angular alignment with respect to the bales to be grouped together and stacked, and to permit the basket to assume a level position at all times notwithstanding the angular disposition of the vehicle and loader mechanism. To this end, and as shown in FIGURES 2, 6 and 7, the suspension unit S consists broadly of a hangar 104, a turntable 105 positioned on the hangar and a rocker 106 suspended from the bale carriage C by means of downwardly extending arms 107.

The hangar 104 is formed of four radially extending arm members 110 projecting from a central hub 111 at the main axis of the suspension unit, and connected to the outer ends of the arm members 110 are thin, elongate rods 112 which are also connected at their lower ends to braces 98 forming a part of the bracket assembly 14. The hub is keyed for rotation on the central shaft 114 extending vertically through the extension unit and a horizontal stationary plate 115 is mounted in spaced relation above the hangar 110, the plate 115 being connected in turn through an upstanding oblong plate 116 into a rocker shaft 117 forming a part of the rocker 106. The horizontal plate 115 is journaled so as not to interfere with the rotation of the shaft 114, and the upstanding plate 116 is provided with an intermediate recessed portion 118 on the underside thereof between the end points of connection into the plate 115 so as to permit interposition of the turntable 105 for location in spaced relation above the plate 115.

The turntable 105 consists of a flat circular plate, also keyed for rotation on the shaft 114, together with means connected to the top surface of the plate to selectively initiate turning movement of the turntable through the hydraulic control circuit. As shown in more detail in FIGURE 6, the above means constitute a cylinder 120 having pivotal end portion 121 for connection into a pivotal member 122 on the turntable such that the cylinder is free to move both angularly and vertically with respect to the turntable. Disposed for movement in the cylinder is a piston rod 123 extending from the opposite end of the cylinder into pivotal connection with a plate 124 projecting from rocker shaft 117. As the turntable is rotated about shaft 114, its movement is limited by the engagement of the end of the cylinder with the upstanding plate 116 on one side of the central hub portion, such that the extent of turning is greater than 90 degrees. To maintain the turntable 105 and hangar 104 in desired spaced relation on the shaft 114 a cap 128 is positioned on the top end of the shaft 114 to abut against the top surface of the plate 116. Similarly, end caps 129 are provided on the ends of the rocker shaft 117 to hold the rocker shaft in place.

The rocker shaft 117 is suitably journaled in bushings provided in openings at the end of the arms 107 and as the arms 107 are caused to vary in angular disposition from the vertical, of course the rocker shaft 117 will be free to rotate with respect to the arm members so as to permit the bale basket to rock in relation to the arms 107 and to maintain itself in a level position. At the same time since the plate 115 is journaled to the main shaft 114 any turning movement imparted to the turntable 105 will not affect the disposition of the rocker 106.

*Bale Carriage and Loader*

Figure 8:
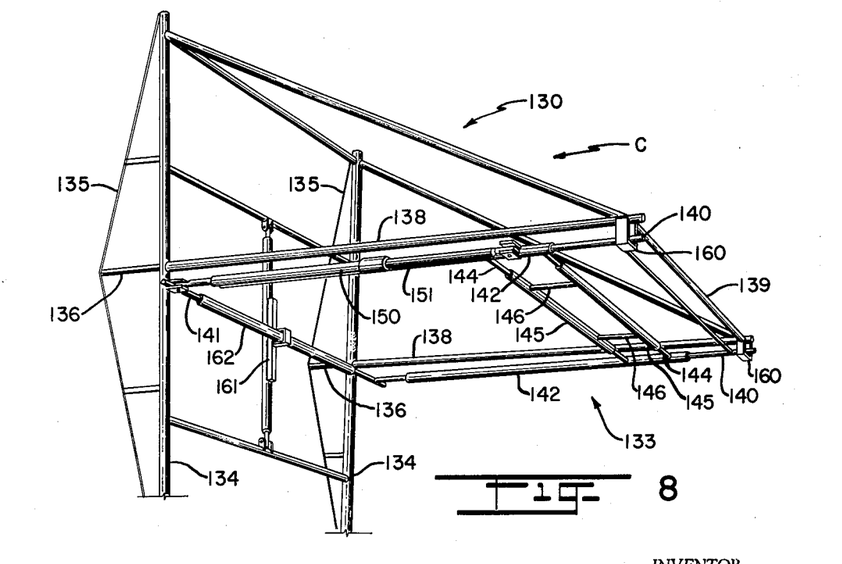
FIGURE 8 is a perspective view of the bale carriage of the present invention.

Serving to support the suspension unit and bale basket B, is the bale carriage C which is comprised essentially of a stationary frame 130 having vertical struts 131 extending downwardly from the rearward end of the frame 130 for connection at the lower end to a linking member 132 forming a part of the loader L. In addition, a slide assembly 133 is mounted beneath the frame 130 to provide for longitudinal and transverse movement of the suspension unit and bale basket.

Due to the weight of the suspension unit and bale basket, especially in the stacking operation with the bales being lifted by the bale basket, the struts 131 are made of heavy duty, rigid tubular members 134 along with suitable bracing, such as cable 135, connected to opposed ends of the tubular members 134. The cable 135 is connected at spaced intervals to rods 136, whereupon tightening of the cable will cause additional restraint to be imposed upon the upright tubular members 134 to prevent possible bending as a result of the weight imposed by the bale basket. The frame 130 in turn is of a generally triangular cross section and projects from the upper end of the vertical strut section with spaced horizontal tubular members 138 and cross members 139 forming the main support section for the slide assembly 133.

As shown in FIGURE 6, the slide assembly consists of stationary guides in the form of tubular members 140 connected at common ends to the end of a common tubular member 141 disposed beneath the back end of the frame 130. Slidably disposed on the guides 140 are elongate sleeves 142 for movement along the length of the guides. Extending across the forward ends of the outer concentric sleeves 142 are stationary cross guides 144 disposed in spaced relation to accommodate a pair of outer concentric sleeves 145. Cross supports 146 serve to interconnect the sleeves 145 and provide support for connection of the arms 107 into the rocker section of the suspension unit S.

To cause back and forth movement of the bale basket with respect to the carriage, a pair of cylinders 150 are pivotally attached at their rearward ends to the back member 141, and piston rods 151 extend from the forward ends of the cylinders and are in turn pivotally connected to the sleeves 142 through extension plates 152. As shown dotted, by supply of fluid pressure, the rods 151 are forced outwardly from the cylinder to cause forward movement of the cross guides connected into the sleeves 142, together with the suspended bale basket B. Conversely, introduction of fluid pressure into the forward ends of the cylinders 150 will cause movement of the piston rods 151 inwardly through the cylinders to pull the bale basket back toward the back end of the carriage.

To initiate sideways movement of the bale basket with respect to the carriage, cylinder 156 is pivotally connected by means of an extension member from its closed end to sleeve 142 and piston rod 158 extends from the opposite end of the cylinder into pivotal connection with a cross support 146. In a similar manner, introduction of fluid pressure into either end of the cylinder 156 will cause sideways movement of the bale basket in the desired direction.

Due to the width and length of the slide elements in the slide assembly, it is greatly preferred to suspend the slide assembly as a separate unit from the frame 130 of the bale carriage and to connect the slide assembly into the lower support members of the bale carriage at, for example, three points so as to minimize binding of the sliding elements as the bale basket is being maneuvered. To this end, the forward extremities of the tubular members 140 are connected into the underside of the horizontal supports 138 by means of U shaped clamps 160 which form cradles to receive members 140, and a clamp 161 is depended from the middle of the lower crossbar of the frame 130 to receive an outer concentric sleeve 162 provided on the back support number 141 of the slide assembly. In this way, the ends of the members 140 and 141 are left free so as to permit some slight adjustment as the slide assembly and connected bale basket are caused to move back, forth, or sideways in relation to the bale carriage.

The bale loader L is of a conventional type consisting of a bottom cross support 170 secured to the rear end of the chassis of the vehicle V with spaced upright standards 171 extending from opposite ends of the support along either side of the vehicle. Opposed lift assemblies 172 extend generally horizontally from the outer ends of the support 170 with connecting braces 174 interconnecting the top ends of the standards 171 with the outer ends of the lift members 172, the brace members 174 being pivotally connected to the top ends of the standards 171. Also shown extending from the standards 171 at the point of pivotal connection of the braces 174 are cables 175 which aid in the support of bale carriage C. The lift members 172 are each comprised of a cylinder 177 extending from the support end with a pair of piston rods 178 extending from the outer ends of the cylinders to cause up and down movement of the bale carriage and associated basket unit B in response to introduction of fluid pressure into the cylinders 177.

Hydraulic Control Circuit

Figure 10:
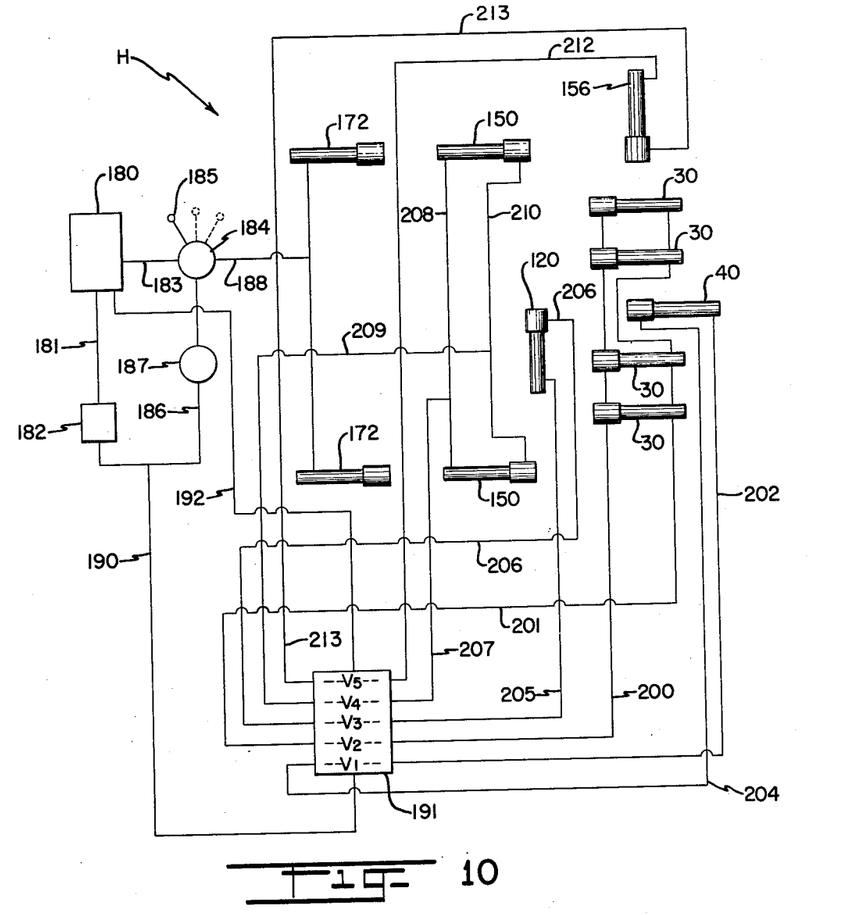
FIGURE 10 is a schematic view of the hydraulic control circuit, in accordance with the present invention.

As indicated schematically in FIGURE 10, the hydraulic control circuit H of the present invention includes a main reservoir 180 having an outlet line 181 leading into pump 182 and return line 183 leading from a valve 184, for controlling the lift members 172, into the reservoir 180. To supply fluid under pressure to the lift members 172, operating handle 185 of the valve 184 is moved to the "raised" position to open the valve for the flow of fluid pressure from the outlet side of the pump 182 through line 186 and open by-pass valve 187 into the line 188 leading to the inside of the rearward portions of the cylinders 177. This causes piston rods 178 to move outwardly through the cylinders 177 in response to the fluid pressure so as to raise the bale carriage and bale basket to the desired height, as shown dotted in FIGURE 1. To maintain the carriage and basket at the desired level, the operating handle 185 may be moved to the "neutral" position so as to close the valve 184 and prevent any return flow of fluid from the lift members 172. When the operating handle is moved to the "lower" position, the valve is closed between the line 186 and line 188 and opened from the line 188 into return line 183 into the reservoir, whereupon the weight of the piston rods acting against the fluid in the cylinders 177 will force the fluid to return through lines 188 and 183 into the reservoir. The pump 182 for this system may be of various desired types, such as a vane pump, and the by-pass valve 187 may be in the form of a globe valve which is manually controlled for opening and closing, as desired.

Leading from the outlet side of the pump is intake line 190 connected into the intake side of a bank of open center control valves, as represented at 191, with an outlet line 192 leading from the opposite side of the valve bank back to the reservoir 180. The bank of valves represented at 191 may suitably consist of a multiple spool combination of five control valves, V1 through V5, having the common intake 190 and the common outlet 192, with a pair of outlets on each valve leading to each end of the double acting cylinders in the control circuit. Although not shown, a suitable multiple spool combination which may be employed in the system of the present invention is the model ST control valve manufactured by the Gresen Manufacturing Company, and when a multiple spool combination of this type is employed, a "power beyond" line not shown is included to relieve any back pressure at the valves. In addition, these valves are commonly actuated by means of levers for each valve, not shown, whereby when one side of the lever is pulled out and away from the valve the outlet of that valve will communicate with the intake side of the line 190 to actuate one side of the double acting cylinder responsive to that valve. When the handle is released the valve will return automatically to a neutral or hold position. Furthermore, to actuate the opposite end of the double acting cylinder, the lever may be pushed in towards the valve to open the other outlet from the intake line to the control line leading to the opposite side of the cylinder. In this connection, to obviate the necessity of unduly long control lines between the respective valves and double acting cylinders, the control valves 191 may be desirably positioned, for example, on a frame, not shown, at the base of the struts 131 and to actuate the handles for each of the valves a cable or chain may be led from each end of the lever for each valve back to a point adjacent the driver's seat where each of the cables may be connected into remote control levers corresponding to the levers on the valve.

Bearing the above in mind, it will be noted from the schematic drawing of FIGURE 10 that a single valve V2 may be used to synchronously operate the four double acting cylinders 30 for each of the fork units, F1 to F4, by opening the outlet of that valve for the flow of fluid under pressure through line 200 leading into one side of each of the cylinders 30 whereupon the piston rods 31 of each of the cylinders will be forced to move inwardly through the cylinders causing the hook members 26 to swing downwardly into engagement with the respective hay bales. In this connection, an advantage of employing a double acting cylinder to operate the opposed hook members 26 of each fork unit is that upon injection of fluid through line 200 into one side of each of the cylinders, the cylinder initially will remain stationary and the piston rod will move inwardly through the cylinder thereby causing only the hook members connected to the end of the piston rod to move downwardly into engagement with the hay bales. At this point, with the hay bales engaged by one side of the fork unit, the piston rod will have moved approximately half way through the cylinder, then continued injection of fluid into the cylinder will force the cylinder to move in relation to the stationary piston rod so as to cause the opposite hook members to swing down into engagement with the opposite side of the hay bale until the piston rod has moved substantially completely through the cylinder, and the hooks have reached their downward limit of movement. Accordingly, the opposite hook members on each fork unit will not move simultaneously into engagement with each of the hay bales, but instead will successively move into engagement such that one end of each fork unit engages that respective end of the hay bale securely before the opposite end of the fork unit is actuated to engage the opposite end of the hay bale. This is advantageous in that by engaging first one end, then the other end of the hay bale, the bales will first be brought into close contact with the bottom of the frame 10 so that the other pair of hooks are able to more securely engage each of the bales as the first pair of hook members holds the bales securely in position. As mentioned, by merely releasing the handle, the valve V2 will assume a neutral position and the hooks will be retained in engagement with the respective hay bales. To release the hooks from engagement with the bales, the handle for the valve is pushed inwardly whereupon the valve is reversed in operation to establish communication from the intake line 190 through line 201, and line 200 communicates through the open center of the bank of valves with return line 192 leading into the reservoir 180. Accordingly, the piston rods 31 for each of the fork units are moved outwardly through the cylinder in response to fluid pressure acting from the opposite end of the cylinders 30 to swing the hooks for the respective fork units from engagement with the hay bales to their upper limit.

Similarly, to actuate the cylinder 40 for aligning and grouping the hay bales together, the handle for valve V1 is manipulated to establish communication between intake line 190 and line 202, the latter being the center control line leading into one side of the cylinder 40, and piston rod 41 will be urged outwardly through the cylinder to engage the cam member 54, thereby causing parallel movement of the fork units and attached bales back against the aligning bar. Thereafter the pulley units 70 and 71 will follow the movement of the piston rod 41 to urge the fork units and attached bales inwardly into close, side by side relation. Again, movement of the handle of valve V1 to the neutral position will maintain the bales in tightly grouped relation until the basket has been maneuvered into position for stacking the bales onto the main stack. At this point, the handle for valve V2 of the fork unit control may be moved to release the hooks from engagement with the bales, and the handle for valve V1 may then be moved inwardly to establish communication between the intake line 190 and return line 204, causing the piston rod 41 to move through the cylinder 40 while fluid pressure in the line 202 is released through return line 192.

To maneuver the bale basket through various angles, turntable control line 205 leads from valve V3 into one side of the double acting cylinder 120 and when the line 205 is opened to communicate with intake line 190, of course the piston rod 121 will be moved outwardly to cause rotation of the turntable and connected bale basket. Line 206 is connected to the opposite end of the cylinder and leads from the other outlet end of the valve V3 so that reversal of the handle toward the valve will cause the line 206 to be opened to move the piston rod inwardly through the cylinder, as desired.

As previously described, the bale carriage is provided with a pair of cylinders 150 which may be actuated to move the bale basket back and forth in relation to the bale carriage, together with the cylinder 156 to control the sideways movement of the bale basket with respect to the bale carriage. To accomplish forward movement of the bale basket along the carriage, line 207 is led from V4 into auxiliary lines 208 leading to the back ends of the respective cylinders 150, whereupon introduction of fluid under pressure will cause the piston rods 151 to move outwardly to carry the connected guides and suspended bale basket therewith. To reverse the movement of the bale basket line 209 is led from the other end of the valve into auxiliary lines 210 leading into the forward ends of the cylinders 150 so that fluid under pressure will cause the piston rods 151 to return inwardly through the cylinders the desired distance. The remaining valve V5 is provided for control of the cross movement of the bale basket on the carriage for which purpose line 212 is led from one outlet of the valve V5 into one end of the cylinder 156 as shown, and line 213 leads from the other outlet of the valve V5 into the opposite end of the cylinder to thereby cause movement of the bale basket in the opposite direction.

It will accordingly be noted that the valves V1 to V5 are disposed in parallel on a common intake line 190 and common return line 192; yet will operate independently of one another to control the various movements of the bale basket in maneuvering from the bale pickup position to the stacking position on the main stack where the bales are released into desired position.

*Operation*

Assuming that a sled loaded with bales arranged in rows thereon is brought into position next to the main stack, not shown, the grouping end stacking apparatus of the present invention may be maneuvered into position directly opposite the sled and stack. In this position the main loader is operated through the valve handle 185 to lower the bale basket unit into position above a group of four loosely aligned bales on the sled. To more exactly position the bale basket over the bales to be stacked, the basket arrangement may be pivoted the desired number of degrees by rotation of the turntable. Without further maneuvering of the vehicle or main loader, the bale basket may be further adjusted back and forth or sideways into desired alignment with the bales through actuation of the cylinders 150, together with cylinder 156. The basket is then lowered into contact with the bales by lowering the main hoist through the valve 184, following which the cylinders 30 for each of the fork units may be simultaneously actuated whereupon the hooks 26 will swing into engagement with the respective bales. Valve V2 may then be brought into play as described to actuate cylinder 40 to carry out the alignment and grouping together of the bales. At this stage in the operation and with valves V1 and V2 in neutral position, the main loader L may be actuated to raise the bales to the desired height and the cylinders 150 and 156 may be actuated to transfer the bales over into desired position above the stack. Of course, movement of the vehicle is sometimes necessary due to the distance of the sled from the point on the main stack where the bales are to be deposited, but is greatly minimized. Notwithstanding the angle of the bales once transferred to an elevated position over the stack, the turntable may be rotated to pivot the basket the necessary angle to properly align the bales in position for lowering onto the stack. The main hoist L may then be lowered to in turn lower the bales into position on the stack, and piston rods 31 and rods 41 reversed to release the bales, following which the fork units will be caused to return to their original positions by means of the return springs.

Since it is customary to stack the bales in tiers at 90 degrees to one another, the suspension unit and carriage play an important part in carrying out the stacking operation with minimum maneuvering of the vehicle. Also, since the bale basket is self-leveling through the suspension unit S, notwithstanding the slope of the ground the bale basket will remain level, but when it comes into contact with the bales will automatically tilt to conform to the surface of the bales and assume a flat position on top of the bales to permit most secure engagement of the hook members 26 with each of the bales.

For purposes of illustration and not limitation relative dimensions and proportions of the major parts of the grouping and stacking apparatus are hereinafter provided. For example, the bale basket may be given a sideways movement with respect to the carriage of eighteen inches and allowed to move forward or backward a distance of two feet with respect to the carriage. As illustrated in the figures, the turntables may be actuated to turn the bale basket through an arc of 120 degrees to the right or left. In turn each of the units F may be given a movement on the order of three to nine inches in both the parallel and transverse direction for alignment of the bales. In the control circuit the maximum pressure developed by the vane pump 182 is in the order of 1,000 p.s.i. with a minimum and maximum operating speed in the range of 300–2,000 r.p.m. Also, control valves of the type described may be normally set for 1,000–1,500 p.s.i. operating pressure and this has been found sufficient to smoothly and closely control the operation of the entire control circuit as desired.

It will be apparent from the foregoing description that the apparatus of the present invention is conformable for various operations other than that described in connection with the transferring and stacking of hay bales. For example, it would only be necessary to replace the hook members and fork units with other suitable types of article engaging means dependent upon the characteristics and size of the articles to be lifted and transferred. However, the apparatus of the present invention is of course especially effective in the engagement, alignment and grouping together of a series of hay bales for transfer onto a stack in the field. Moreover, although the preferred form of invention has been described in conjunction with the use of a hydraulic control circuit as the sole source of power for actuating the various components of the apparatus, it will be apparent that various modifications may be made in the circuit and in the type of circuit employed to control the various movements of the bale basket.

It is accordingly to be understood that various modifications and changes may be made in the construction and arrangement of the parts and components as described with respect to the preferred embodiment, without departing from the scope of this invention, as defined by the appended claims.

What is claimed is:

1. In a grouping and stacking apparatus, a frame, a plurality of article engaging and release units, means mounting said units for parallel and transverse movement relative to one another independently of said frame, first means operably connected to said units being movable along a predetermined path of travel to cause parallel movement of said units, aligning means on said frame to limit the parallel travel of articles engaged by said units, and means interconnecting said units being disposed in the path of travel of said first means and being responsive to the movement of said first means to cause transverse movement of said units toward one another.

2. In a grouping and stacking apparatus according to claim 1 wherein there is provided at least one pair of article engaging and release units, and said second means is defined by a flexible linking member trained through pulley means for connection to each pair of said units with said linking member being disposed in the path of travel of said first means to thereby follow the movement of said first means in such a way as to urge said units connected to said linking member toward one another.

3. In a grouping and stacking apparatus according to claim 2 wherein said article engaging and release units are each comprised of opposed sets of hooks mounted for pivotal movement about a horizontal axis to swing down into engagement with a hay bale and the like together with actuating means connected between each of said opposed sets of hooks to cause movement of said hooks into and out of engagement with the hay bales, and control means connected to said actuating means for selective energization thereof.

4. In an article handling apparatus, the sub-combination comprising a frame, a plurality of article handling units, means mounting said units for parallel movement relative to one another on said frame, said means including a hydraulically actuated cylinder and a piston rod movable through said cylinder and with means connected to said units being engageable with one end of said rod to cause parallel movement of said units in response to movement of said rod, actuating means on each unit to control engagement and release by each unit of an article, means operably connected to said units to cause parallel movement of said units in a common direction, and aligning means extending from said frame to limit the parallel travel of the articles engaged by said units, means associated with said piston rod to provide for a constant length of travel of said rod notwithstanding the extent of said units required to align the articles with said aligning means, said means engageable with one end of said piston rod including a cam extending into the path of movement of said rod, and a shaft for said cam having rocker arms extending therefrom for engagement into each of said units to cause parallel movement of said units in response to movement of said cam.

5. In an article handling apparatus according to claim 4 wherein there are provided a pair of said units on opposite sides of said first named means, a rocker arm disposed for extension between each pair of said units, and means interconnecting said rocker arms and said pairs of units to provide for varying lengths of travel of each unit in accordance with the distance of travel necessary to align the article engaged by that unit with said aligning means.

6. An article handling apparatus comprising a rectangular frame, a pair of outer and inner fork units including means mounting said units for slideable parallel and transverse movement relative to one another on said frame, a double acting hydraulically actuated cylinder and a piston rod movable therethrough being centrally disposed between said units, means including a cam extending from a shaft into the path of movement of said piston rod together with a rocker arm extending from each end of said shaft for connection to each pair of said units on opposite sides of said cylinder thereby to cause parallel movement of said units in response to movement of said cam, a pair of vertically spaced pulley units operably connected to said rod, to follow the movement thereof including a linking member for each pulley unit and guide means therefor, one linking member being connected to the inner pair of fork units and the other linking member being connected to the outer pair of fork units, said linking members being engaged at a predetermined point in the travel of said pulley units to urge said fork units together, a lining bar to limit the parallel travel of the articles on said units, and resilient means associated with said piston rod to provide for a constant length of travel of said rod notwithstanding the extent of travel of said units in the parallel and transverse directions necessary for aligning and grouping the articles together.

7. An article handling apparatus according to claim 6 wherein there is provided a roller assembly connected to each of said rocker arms and a cable on said rocker assembly having a resilient connecting member at each end thereof for connection to said units whereby the movement of each unit in response to the movement of said rocker arms is made variable in accordance with the distance of travel necessary to align the respective articles on said fork units.

8. An article handling apparatus according to claim 6 wherein resilient return means are connected between each of said units and said frame to cause said units to return to their original positions upon reversal in the direction of movement of said piston rod.

References Cited in the file of this patent

UNITED STATES PATENTS

| | | |
|---|---|---|
| 1,601,868 | Luce | Oct. 5, 1926 |
| 2,588,276 | Naillon | Mar. 4, 1952 |
| 2,591,431 | Henggeler | Apr. 1, 1952 |
| 2,622,915 | Horn | Dec. 23, 1952 |
| 2,717,705 | Jacobson | Sept. 13, 1955 |
| 2,734,646 | Stimpson | Feb. 14, 1956 |
| 2,886,197 | Harris | May 12, 1959 |
| 2,903,290 | Morris | Sept. 8, 1959 |